US008885634B2

(12) United States Patent
Ghodrat et al.

(10) Patent No.: US 8,885,634 B2
(45) Date of Patent: Nov. 11, 2014

(54) SYSTEMS AND METHODS FOR CARRIER ETHERNET USING REFERENTIAL TABLES FOR FORWARDING DECISIONS

(75) Inventors: Morteza Ghodrat, Kanata (CA); Michael Gazier, Ottawa (CA); Ian Duncan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 1384 days.

(21) Appl. No.: 11/947,996

(22) Filed: Nov. 30, 2007

(65) Prior Publication Data

US 2009/0141703 A1    Jun. 4, 2009

(51) Int. Cl.
| | |
|---|---|
| H04L 12/66 | (2006.01) |
| G01R 31/08 | (2006.01) |
| H04J 1/16 | (2006.01) |
| H04L 1/00 | (2006.01) |
| H04L 12/28 | (2006.01) |
| H04L 12/721 | (2013.01) |
| H04L 12/801 | (2013.01) |
| H04L 12/813 | (2013.01) |
| H04L 12/701 | (2013.01) |
| H04L 12/46 | (2006.01) |
| H04L 12/851 | (2013.01) |
| H04L 12/815 | (2013.01) |
| H04L 12/935 | (2013.01) |
| H04L 12/931 | (2013.01) |

(52) U.S. Cl.
CPC .......... H04L 12/4641 (2013.01); H04L 45/66 (2013.01); H04L 47/10 (2013.01); H04L 47/20 (2013.01); H04L 45/00 (2013.01); H04L 47/2441 (2013.01); H04L 49/3009 (2013.01); H04L 47/22 (2013.01); H04L 49/354 (2013.01)
USPC .................... 370/352; 370/230.1; 370/395.31

(58) Field of Classification Search
USPC ......... 370/352, 395.53, 338, 351, 230, 230.1, 370/389, 392, 395.31
See application file for complete search history.

(56) References Cited

U.S. PATENT DOCUMENTS

| | | | | |
|---|---|---|---|---|
| 6,085,238 | A  * | 7/2000 | Yuasa et al. | 709/223 |
| 7,082,138 | B2 * | 7/2006 | Yik et al. | 370/410 |
| 7,082,140 | B1 * | 7/2006 | Hass | 370/466 |
| 7,339,942 | B2 * | 3/2008 | Morgan et al. | 370/412 |
| 7,401,118 | B1 * | 7/2008 | Yokota et al. | 709/203 |
| 7,688,829 | B2 * | 3/2010 | Guichard et al. | 370/395.31 |
| 2002/0031142 | A1* | 3/2002 | Metin et al. | 370/463 |
| 2004/0174879 | A1* | 9/2004 | Basso et al. | 370/392 |

(Continued)

FOREIGN PATENT DOCUMENTS

| | | | | |
|---|---|---|---|---|
| WO | 0147185 A | | 6/2001 | |
| WO | WO2007085198 | * | 1/2007 | H04L 12/56 |

*Primary Examiner* — Hoang-Chuong Vu
(74) *Attorney, Agent, or Firm* — Clements Bernard PLLC; Christopher L. Bernard; Lawrence A. Baratta, Jr.

(57) ABSTRACT

The present invention utilizes specific referential tables for forwarding decisions while maintaining current mechanisms of Ethernet addressing and QoS marking. The referential tables are utilized for forwarding decisions based on any and/or multiple fields within the packets simultaneously, such as, for example, incoming port number, incoming MAC, incoming VLAN, outgoing MAC, outgoing VLAN, P-bits, DSCP, MPLS label, TCP/UDP port numbers, IP, SIP, HTTP, and the like. A user can define the forwarding criteria based on any combination/permutation fields in the packet. Advantageously, the present invention removes the need to introduce explicit tunnel labels in the Ethernet frame in order to maintain the desired QoS within the network removing explicit labeling requirements.

15 Claims, 4 Drawing Sheets

(56) References Cited

U.S. PATENT DOCUMENTS

| | | | |
|---|---|---|---|
| 2004/0202184 A1* | 10/2004 | Yazaki et al. | 370/395.31 |
| 2005/0071454 A1* | 3/2005 | Ellis et al. | 709/223 |
| 2005/0089054 A1 | 4/2005 | Ciancaglini | |
| 2005/0220096 A1 | 10/2005 | Friskney et al. | |
| 2005/0265355 A1* | 12/2005 | Havala et al. | 370/395.53 |
| 2006/0072589 A1* | 4/2006 | Mandavilli et al. | 370/400 |
| 2007/0058638 A1* | 3/2007 | Guichard et al. | 370/395.31 |
| 2007/0133549 A1* | 6/2007 | Lee et al. | 370/392 |
| 2008/0151899 A1* | 6/2008 | Li | 370/392 |
| 2009/0028062 A1* | 1/2009 | Meloche et al. | 370/252 |
| 2009/0097490 A1* | 4/2009 | Sanderson et al. | 370/395.53 |
| 2011/0305242 A1* | 12/2011 | Miki et al. | 370/392 |
| 2013/0235875 A1* | 9/2013 | Mohan et al. | 370/395.53 |

* cited by examiner

SYSTEMS AND METHODS FOR CARRIER ETHERNET USING REFERENTIAL TABLES FOR FORWARDING DECISIONS

FIELD OF THE INVENTION

The present invention relates generally to communication networks, and more particularly, the present invention provides systems and methods for Carrier Ethernet using referential tables for forwarding decisions in lieu of explicit tunnel labels in the Ethernet frame.

BACKGROUND OF THE INVENTION

Modern networks, such as access and aggregation networks, are moving towards Ethernet as the universal medium. However, Ethernet is not quite robust enough for carrier transport applications. Thus, a new variation termed "Carrier Ethernet" has been created. Carrier Ethernet is configured to provide Ethernet-based operations, administration, and maintenance (OAM). There are many variations of this type of Ethernet, for example Optical Transport Network (OTN) carriage of Ethernet is a form of carrier Ethernet. OTN can offer a form of tunneling, and in addition offers hardening features such as embedded forward error correction (FEC).

Referring to FIG. 1, an Ethernet frame 10 with Virtual Local Area Network (VLAN) tagging is illustrated in one instance of Carrier Ethernet. VLAN Tagging is defined in IEEE 802.1Q as a standard to allow multiple bridged networks to transparently share the same physical network link without leakage of information between networks (i.e. trunking). The Ethernet frame 10 in IEEE 802.1Q is not actually encapsulated. Instead, the EtherType value (for Ethernet II framing) in the Ethernet header is set to hex 8100, identifying this frame as an 802.1Q frame. Also, four extra bytes are added after the Ethernet header consisting of two-byte Tag Control Information (TCI). VLAN ID (VID) is a 12-bit field specifying the VLAN to which the frame 10 belongs. A value of "0" means the frame 10 does not belong to any VLAN (so that the 802.1Q header specifies only a priority), a value of "1" is used with bridges, and a value of hex FFF is reserved for implementation use; all other values can be used as VLAN identifiers, allowing up to 4093 VLANs.

VLAN tagging is a Media Access Control (MAC) option that provides three important capabilities not previously available to Ethernet network operators and users. First, it provides a quality-of-service (QoS) mechanism to expedite time-critical network traffic by setting transmission priorities for outgoing frames 10. Second, it allows stations to be assigned to logical groups to communicate across multiple LANs as though they were on a single LAN. For example, bridges and switches filter destination addresses and forward VLAN frames only to ports that serve the VLAN to which the traffic belongs. Finally, VLAN tagging simplifies network management and makes adds, moves, and changes easier to administer.

The VLAN header includes two fields: a reserved 2-byte type value, indicating that the frame is a VLAN frame, and a two-byte Tag-Control field 14 that contains both the transmission priority (0 to 7, where 7 is the highest) and a VLAN ID 12 that identifies the particular VLAN over which the frame is to be sent. The receiving MAC reads the reserved type value, which is located in the normal Length/Type field position, and interprets the received frame as a VLAN frame. If the MAC is installed in a switch port, the frame is forwarded according to its priority level to all ports that are associated with the indicated VLAN identifier. If the MAC is installed in an end station, it removes the 4-byte VLAN header and processes the frame in the same manner as a basic data frame. VLAN tagging requires that all network nodes involved with a VLAN group be equipped with the VLAN option.

Referring to FIG. 2, an Ethernet frame 20 for Provider Backbone Transport (PBT) according to IEEE 802.1ah is illustrated in another instance of Carrier Ethernet. PBT is a set of enhancements to Ethernet technology that allows the use of Ethernet as a carrier-class transport network. PBT uses the concepts of VLAN tagging as per IEEE 802.1Q, Q-in-Q as per IEEE 802.1ad and MAC-in-MAC as per IEEE 802.1ah (Provider Backbone Bridges (PBB)) but disables the concept of flooding/broadcasting and spanning tree protocol (SPT). The idea here is to use Ethernet for connection oriented purpose as is the case with present SDH/SONET transport by stripping down the complexity involved with the present Ethernet LAN. It simplifies the OAM, as in SDH/SONET world, by using additional extensions based on IEEE 802.1ag. It also provides extensions so as to provide path protection levels similar to the UPSR protection in SDH/SONET network.

In the Ethernet frame 20, the tunnel is encoded by the destination MAC address of the backbone egress switch (B-DA) as well as a 12-bit VLAN-tag (backbone tag, B-VID). PBT forms a topology of B-DA rooted trees and an independent sink-tree is configured for each <B-DA, B-VID> pair. Since no SPT algorithm has to be performed, the trees need not be spanning. Thus, up to 4096 different trees can be configured for one B-DA.

IEEE 802.1ad (Provider Bridges) is an amendment to IEEE standard IEEE 802.1Q-1998 (also known as Q-in-Q or Stacked VLANs), intended to develop an architecture and bridge protocols to provide separate instances of the MAC services to multiple independent users of a Bridged Local Area Network in a manner that does not require cooperation among the users, and requires a minimum of cooperation between the users and the provider of the MAC service. For example Q-in-Q can operate as follows: two VLAN tags are added to each customer Ethernet packet. The Ethernet VLAN tag includes both a 12-bit VLAN ID and a 3-bit priority tag. The inner VLAN is customer assigned, and the outer VLAN corresponds to the carrier's assignment of a tunnel in which customer traffic is carried. For example, multiple customer flows may be "clustered" into the outer VLAN. A part of the VLAN assignment can include a 3-bit p-bit priority marking per 802.1p. The VLAN assignment can indicate how the traffic is to be prioritized. Sometimes, the Ethernet packet priority is derived from the IP layer's DiffServ Code Point (DSCP) bits. The VLAN assignment can also indicate the shaping assigned to an Ethernet flow cluster.

In another example, PBT is used as a similar alternative to Q-in-Q except that two MAC addresses are used instead of two VLAN IDs. Each of these MAC addresses can be associated to a VLAN also, and as such has the priority markings. This is similar to the Q-in-Q except that the tunnel label field includes the MAC and that two MAC addresses are used instead of two VLANs. Another difference with PBT is that the management system normally assigns the MAC/VLAN labels along the tunnel path Ethernet switches. Once again, prioritization and clustering is done via the MAC+VLAN label.

Transport Multi-protocol Label Switching (T-MPLS) is an ITU-T defined network layer technology that uses a subset of the existing MPLS standards and is designed specifically for application in transport networks. T-MPLS offers a simpler implementation by removing features that are not relevant to connection-oriented packet-switched applications and adding mechanisms that provide support of critical transport functionality. For prioritization in T-MPLS, an MPLS shim header is used. In this scheme, the MPLS label is used to define a traffic engineered path for with the Ethernet frames must follow. The QoS can be explicit or implicit depending on the label implementation/policy.

Disadvantageously, all of the above described methods require prioritization to be marked in either the form of VLAN bits or MPLS labels, i.e. pre-determined or explicit. This leaves little flexibility in the grouping of individual Ethernet flows for the purpose of shaping and prioritization. For example, all Ethernet packets in one VLAN are treated with the priority of that VLAN.

BRIEF SUMMARY OF THE INVENTION

In various exemplary embodiments, the present invention maintains current mechanisms of Ethernet addressing and QoS marking with the addition of specific referential tables. The referential tables are utilized for forwarding decisions based on any and/or multiple fields within the packets simultaneously, such as, for example, incoming port number, incoming MAC, incoming VLAN, outgoing MAC, outgoing VLAN, P-bits, Differentiated Services Code Point (DSCP), MPLS label, Transmission Control Protocol/User Datagram Protocol (TCP/UDP) port numbers, IP, Session Initiation Protocol (SIP), Hypertext Transfer Protocol (HTTP), and the like. A user can define the forwarding criteria based on any combination/permutation fields in the packet. Advantageously, the present invention removes the need to introduce explicit tunnel labels in the Ethernet frame in order to maintain the desired QoS within the network removing explicit labeling requirements.

In an exemplary embodiment of the present invention, a system for Carrier Ethernet using referential tables for forwarding decisions includes a plurality of interconnected switches/routers, wherein one or more of the plurality of interconnected switches/routers includes an ingress switch/router, wherein each ingress switch/router is configured to one of prioritize and shape data based upon a referential table including a plurality of clusters and associated priority and bandwidth for each of the plurality of clusters. The data entering at each of the ingress switch/router is assigned to one of the plurality of clusters based upon one of media access control (MAC) source/destination pair, virtual local area network (VLAN) identification, and a combination thereof. Optionally, the referential table includes a first table and a second table, and wherein the first table includes clusters for outer labels, and the second table includes clusters for inner labels. The referential table is provisioned through one of a network management system, element management system, craft interface, a control plane, a northbound CORBA interface, provider backbone transport (PBT), provider backbone bridging traffic engineering (PBB-TE), IP multimedia subsystem (IMS), and a combination thereof. Optionally, the referential table is provided to the ingress switch/router through one of downloading using simple network management protocol and signaling using a control plane. Alternatively, the referential table further includes policy information for the plurality of clusters. Optionally, the referential table further includes inner/outer MAC source/VLAN source and MAC destination/VLAN destination, inner MAC source and outer VLAN destination, DiffServ Code Point, Internet Protocol (IP) address, Session Initiation Protocol, Multi-protocol Label Switching (MPLS) labels, p-bits, Transmission Control Protocol/User Datagram Protocol (TCP/UDP) port numbers, and combinations thereof for each of the plurality of clusters. Alternatively, the ingress switch/router is configured to utilize the referential table for subscriber grouping, traffic engineering, policy control, Quality of Service, and combinations thereof without requiring explicit labels in Ethernet frames.

In another exemplary embodiment of the present invention, a method for Carrier Ethernet using referential tables for forwarding decisions includes receiving incoming data flows at an ingress switch/router, assigning each of the incoming data flows to a cluster of a plurality of clusters in a referential table, and one of prioritizing and shaping the incoming data flows responsive to provisioning in the referential table. The assigning is based upon one of media access control (MAC) source/destination pair, virtual local area network (VLAN) identification, and combinations thereof of the incoming data flows. Optionally, the method for Carrier Ethernet includes provisioning bandwidth and priority of the plurality of clusters. The provisioning is through one of a provisioning through a management system, downloading using simple network management protocol, signaling using a control plane, northbound CORBA interface, provider backbone transport (PBT) mechanisms, provider backbone bridging traffic engineering (PBB-TE) mechanisms, and IP multimedia subsystem (IMS) mechanisms. Optionally, the referential table further includes policy information for the plurality of clusters, and the method of Carrier Ethernet further includes enforcing policy on the incoming data flows. Alternatively, the method for Carrier Ethernet of further includes grouping of subscribers in the incoming data flows responsive to the referential table, engineering traffic in the incoming data flows responsive to the referential table, and managing Quality of Service responsive to the referential table.

In yet another exemplary embodiment of the present invention, a network element for Carrier Ethernet using referential tables for forwarding decisions includes one or more line cards receiving ingress traffic and transmitting egress traffic, and a referential table including a plurality of clusters and associated priority and bandwidth for each of the plurality of clusters, wherein ingress traffic is assigned to one of the plurality of clusters responsive to media access control (MAC) source/destination pair, virtual local area network (VLAN) identification, and a combination thereof, and wherein egress traffic is shaped and prioritized responsive to the associated priority and bandwidth. Optionally, the network element is connected to an over-provisioned switch, and the network element is configured to control bandwidth of the plurality of clusters to the over-provisioned switch responsive to a bandwidth of the over-provisioned switch. The referential table is provisioned through one of a network management system, element management system, craft interface, and a combination thereof. Optionally, the referential table is provided to the ingress switch/router through one of downloading using simple network management protocol and signaling using a control plane. Alternatively, the referential table further includes policy information for the plurality of clusters. The network element is configured to utilize the referential table for subscriber grouping, traffic engineering, policy control, Quality of Service, and combinations thereof without requiring explicit labels in Ethernet frames.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention maintains current mechanisms of Ethernet addressing and QoS marking with the addition of specific referential tables. The referential tables are utilized for forwarding decisions based on any and/or multiple fields within the packets simultaneously, such as, for example, incoming port number, incoming MAC, incoming VLAN, outgoing MAC, outgoing VLAN, P-bits, DSCP, MPLS label, TCP/UDP port numbers, IP, SIP, HTTP, and the like. A user can define the forwarding criteria based on any combination/permutation fields in the packet. Advantageously, the present invention removes the need to introduce explicit tunnel labels in the Ethernet frame in order to maintain the desired QoS within the network removing explicit labeling requirements.

Figure 1:
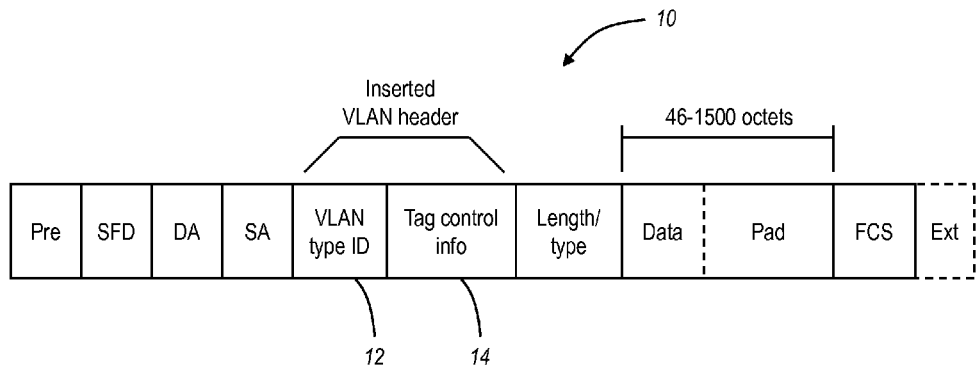
FIG. 1 is an Ethernet frame with Virtual Local Area Network (VLAN) tagging according to IEEE 802.1Q.
Figure 2:
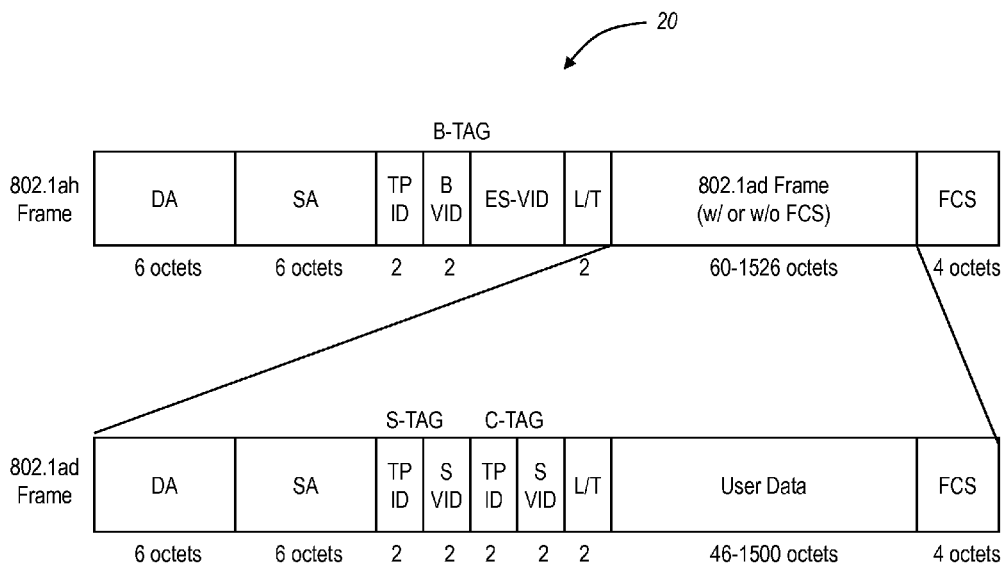
FIG. 2 is an Ethernet frame for Provider Backbone Transport (PBT) according to IEEE 802.1 ah.
Figure 3:
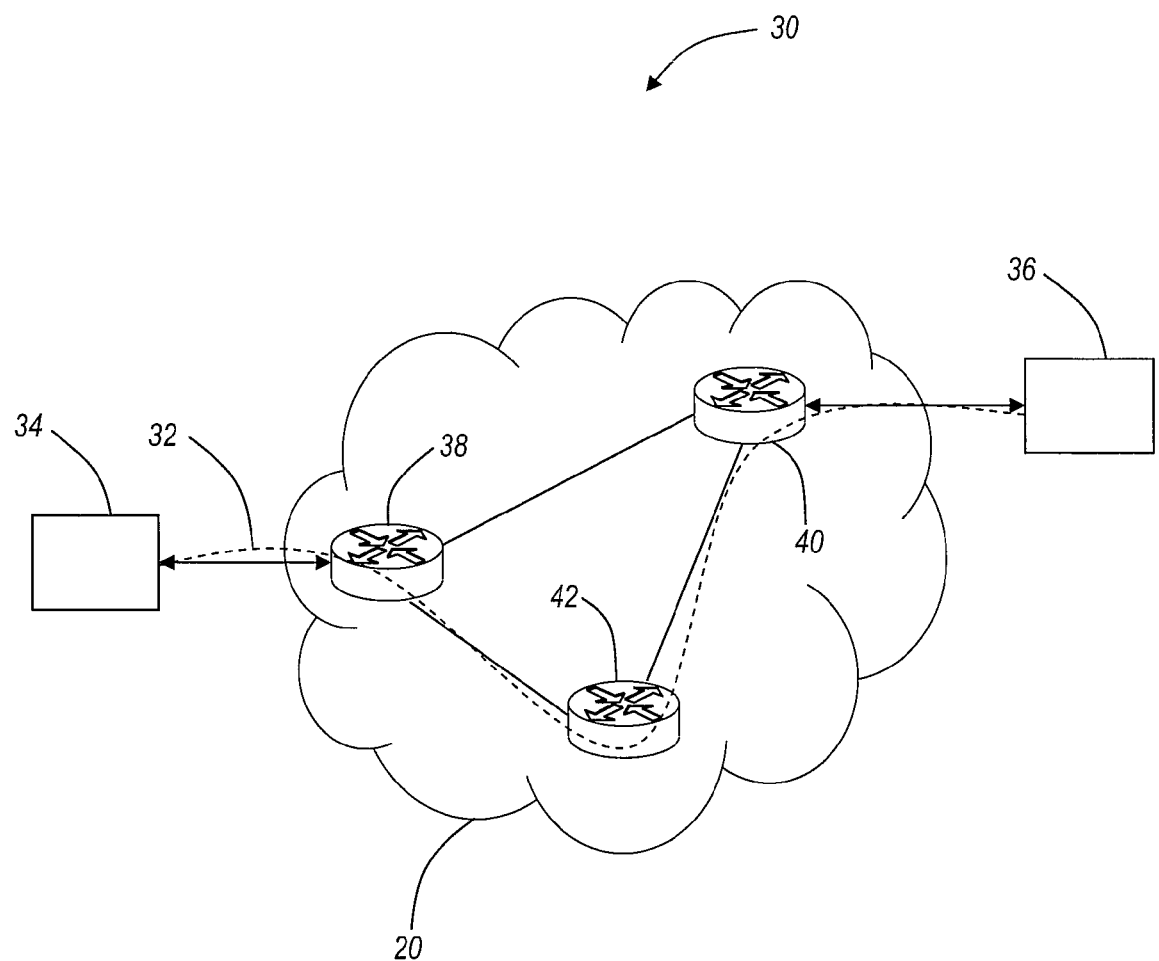
FIG. 3 is a diagram of a Carrier Ethernet network according to an exemplary embodiment of the present invention.

Referring to FIG. 3, a Carrier Ethernet network 30 is illustrated according to an exemplary embodiment of the present invention. The network 30 includes a connection 32 between clients 34,36. The clients 34,36 are interconnected through the network 30. In this exemplary embodiment, the client 34 connects to a switch/router 38. The client 36 connects to a switch/router 40, and the switch/routers 38,40 are interconnected through an intermediate switch/router 42.

In an exemplary embodiment of the present invention, the network 30 utilizes any of the Carrier Ethernet mechanisms described herein. Additionally, the Ethernet labels of the Carrier Ethernet mechanisms can be augmented for the purposes of strengthening addressing capabilities and for the purpose of segregating customer address space from carrier address space. Thus, a tunnel is created in which a cluster of Ethernet flows (within which possibly many Internet Protocol (IP) flows reside) can cross the network 30 through the connection 32, as depicted in FIG. 3.

The present invention maintains current mechanisms of addressing and QoS marking augmented with specific referential tables. Accordingly, it is unnecessary to introduce explicit tunnel labels in Ethernet frames despite VLAN (802.1p), PBT (MAC-in-MAC), and T-MPLS-based solutions in order to maintain the desired QoS within the network. The present invention utilizes forwarding tables to make forwarding decision on any and/or multiple fields within packets simultaneously (e.g., incoming port number, incoming MAC, incoming VLAN, outgoing MAC, outgoing VLAN, P-bits, DSCP, MPLS label, TCP/UDP port numbers, IP, SIP, HTTP, etc.). It is up to a user to define the forwarding criteria based on any combination/permutation fields in the packet. The frame forwarding and QoS enforcements of the present invention are extremely flexible compared to the conventional mechanisms where they impose explicit labels.

Figure 4:
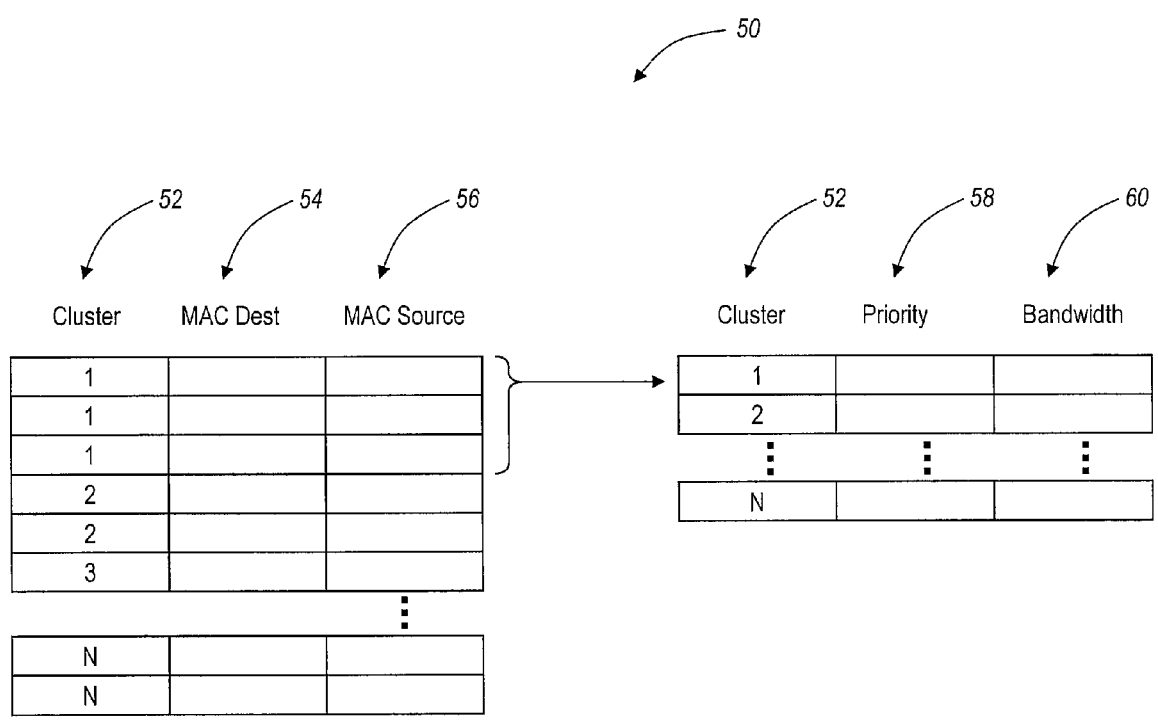
FIG. 4 is a forwarding table for defining clusters and prioritizing and shaping traffic according to an exemplary embodiment of the present invention.

Referring to FIG. 4, a forwarding table 50 is illustrated according to an exemplary embodiment of the present invention. The table 50 defines clusters 52 between MAC destination addresses 54 and MAC source addresses 56. Accordingly, the table 50 allows the present invention to assign multiple MAC ID's (e.g., source plus destination pairs, VLANs, etc.) to a cluster. Once defined, the table 50 can define various parameters for each cluster 50, such as priority 58, bandwidth 60, and the like.

The forwarding table 50 is utilized at an ingress switch/router in a Carrier Ethernet network to create clusters 52 from multiple ingress flows. The table 50 eliminates the requirement to utilize labels within the network as the clusters 52 are used to prioritize or shape data entering the network at the ingress switch/router. Typically, only the first switch/router in a network (i.e., the ingress switch) is used to shape traffic. The first switch/router can be connected to clients, it can be the first at the edge of a second carrier network, or it can be the first from intra-carrier application elements, such as cache servers.

For example, in FIG. 3, the switch/router 38 can have multiple flows entering it, such as from the client 34. Accordingly, the switch/router 38 is an ingress switch/router. Utilizing the forwarding table 50, the switch/router 38 is able to create the clusters 52 to segment the multiple entering flows. Thus in FIG. 3, a network segment between switch/router 38 and switch/router 42 can have many VLAN, MAC, tunnels, clusters, etc. traversing it. However by the definition of the clusters 52 in the table 50, the present invention is able to create controlled traffic without needing to rely solely on the p-bits or other mechanisms. Instead, the present invention uses virtual definitions as described in the table 50. For example, a given cluster can occupy and be limited to 100 Mbps on the network segment.

The forwarding table 50 represents an example of a typical application in this table, and there can be more or less columns in the table 50. Note, the forwarding table 50 can include any fields, such as DSCP plus IP header plus time-of-day, etc. For example, the table 50 could also include VLAN. The forwarding table 50 can assign either inner MAC/VLAN to the table, outer VLAN/MAC to the table, or both, and this can be done per flow. Also, the present invention can also assign higher layer data such as DSCP, IP addresses, SIP addresses, and the like.

The forwarding table 50 is configured to be stored at one or more ingress switches/routers in the network. For example, the table 50 can be built through user provisioning, such as from a network management system (NMS), element management system (EMS), craft interface (CI), northbound CORBA interface, or the like. The NMS, EMS, CI, etc. can include software tools to receive user input to build the table. Additionally, the table 50 can be downloaded to switches/routers, such as through Simple Network Management Protocol (SNMP). Also, the forwarding table 50 can be signaled by a control plane. Also, provisioning can be done using standard PBT, PBB-TE, or IMS mechanisms.

One advantage of limiting the rate into clusters 32 is for the next switch/router in the network, e.g. switch/router 42 in FIG. 3. The next switch/router could be an over-provisioned switch and controlling such cluster flows can help design low cost switches. For example, a line card on the switch/router 42 could have 20 Gigabit Ethernet (GE) ports, but a backplane bandwidth of only 10 GE, thus ensuring the sum of clusters to the switch/router 42 is less than 10 GE allows lower buffer sizes in the line card. Note, it is likely the line card has to allow for some burstiness in order to allow highest network use, i.e. the average flow out of the line card can be 10 GE, but the burstiness into it could be much higher and is limited by QoS contracts and buffer sizes. Another example of design is that the switch/router 42 could have a series of switch fabrics. For example the lower cost one is 10 GE per line card and the higher cost one is 20 GE per line card. The present invention is configured to operate on over-provisioned and non-over-provisioned switches.

Thus by being able to control the ingress bandwidths (via cluster management), the present invention can build appropriately sized and behaving switches for a variety of switch sizes. This is important even more in access networks where customers want to build right sized and lower capacity used networks, especially in the upstream (towards the core) direction.

As noted, clusters do not preclude existing mechanisms to shape or prioritize traffic. For example, the present invention can prioritize traffic within a given cluster with zero provisioning by assigning a policy to assign intra-cluster priority by using the inner label p-bits. This allows the carrier to assign a cluster of a given priority and bandwidth, but the customer can define the priority of the traffic in their cluster. This is an example of a private line service. Policies per flow (i.e., table entry) or cluster can include coloring and discarding as required.

A further example is to allow assigning one priority level to a general fair use class (best effort). As such, the present invention could have a policy that says a cluster is guaranteed a given bandwidth and priority, but further than that, the customer's traffic is handled in a fair-sharing mechanism with other clusters, possibly up to given maximal bandwidth.

Additionally, the present invention can support "tables in tables", i.e. re-entrant clusters. Here, there is one table for outer labels and one for inner labels. This allows a completely virtualized definition of flows from which full traffic shaping can be derived. Optionally, policing can be applied to clusters. Policing can result in colored packets, in discarded packets, in flow control assertions over the physical media, in message ebased flow control back to the source, in remarking of packet priorities, in over-billing, etc. as per policies and as per switch element capabilities.

Advantageously, the present invention controls bandwidth flowing through network switches/routers resulting in a well-behaved and controlled network with predictable behavior. This can provide improved support for Time Division Multiplexed (TDM) and other real-time services. This allows further benefits such as being able to pass high priority services through the network with enhanced characteristics. Thus for example, if a link occupancy is limited to 30% (as example), there can be low jitter TDM services being carried on the link. Typically, the TDM services would be carried with pseudowire emulation edge to edge (PWE3) in an Ethernet environment.

It is greatly beneficial to be able to guarantee low jitter for TDM and for real-time services. Real-time services typically include TDM transport, voice including Voice over IP (VoIP), video, and the like. Being able to reduce jitter and/or delay in a predictable way allows end devices to reduce buffer sizes and to reduce retransmissions of errored packets (referencing to IPTV or equivalent), to maintain highest quality video rates effective (referencing IPTV or equivalent) and the like. Also, with smaller buffer sizes, faster channel change times can be offered, or reduce end equipment cost and complexity, etc. Note that the buffer sizes can be adaptive or provisioned. These sorts of behaviors fit well within characteristics that are desirable in Carrier Ethernet.

The present invention avoids the need to provision VLANs, and has no issues with overlapping VLAN tags that need to be managed end to end in current mechanisms. Also, in current switches, QoS for higher layers links VLAN to higher layers. For example, to do layer two QoS (or layer three, four, etc.), conventional implementations of VLAN or labels in general (e.g., MAC-in-MAC, T-MPLS, etc.) follow two schemes: (1) label used for domain partitioning where each carrier imposes its own rules to the Ethernet flows (including QoS), and (2) label is used for traffic engineering which means the label is tightly coupled with the service needs at the higher layers. On an IP layer stream one first classifies the layer three (or other layer) streams into a layer two VLAN (or outer label MAC for MAC-in-MAC or PBT) and then one can apply the QoS (such as shaping) to this VLAN.

In the present invention, layer two QoS is done on any layer without the need to attach it to a VLAN, MAC-in-MAC, T-MPLS or other layer two mechanism, i.e. policing and shaping is done through the forwarding table 50 to the clusters 52. This allows sophisticated deep layer treatment in a layer two environment, such as Carrier Ethernet, without the need to tie the streams to layer two labels. Thus offering deep packet inspection flexibility for fine grained handling, in a pure Ethernet switch context.

This results in Ethernet being used in a "transport" behavior, i.e. emulating in some ways a SONET/SDH switch behavior. This is because of characteristics including: the bandwidths are well controlled, pre-provisioned, and lead to deterministic jitter and delay behaviors. Again, to do this today you either need Ethernet flow control protocols (e.g., IEEE 802.3x) or a label to shape the traffic into. Both of these have scalability issues.

Using a specific VLAN, MAC address, or other labeling convention in line with current switch capabilities, the present invention enhances current operations, administration, and maintenance (OAM) capabilities by creating a reserved/special communication channel. Here, the system can auto detect the assigned QoS and tunnel attributes via special (reserved) label (similar to ILMI), or upon the reboot it attempts to connect to special address (MAC)—server, to get its provisioning info to avoid manual provisioning at each hop (like DHCP).

Alternatively, the system has a preconfigured tunnel and QoS for various services that can come up by default. Also, the present invention can provide heartbeat and performance level monitoring (and alarm if things go wrong), etc. as part of this set of OAM/PM (performance monitoring) feature set.

The present invention eliminates overhead associated with current mechanisms, and removes VLAN scaling issues. The present invention allows the forwarding decision to be made based on fields at or above layer two. The fields in the forwarding table 50 are used above layer two to distinguish various tunnels between same end-points.

Figure 5:
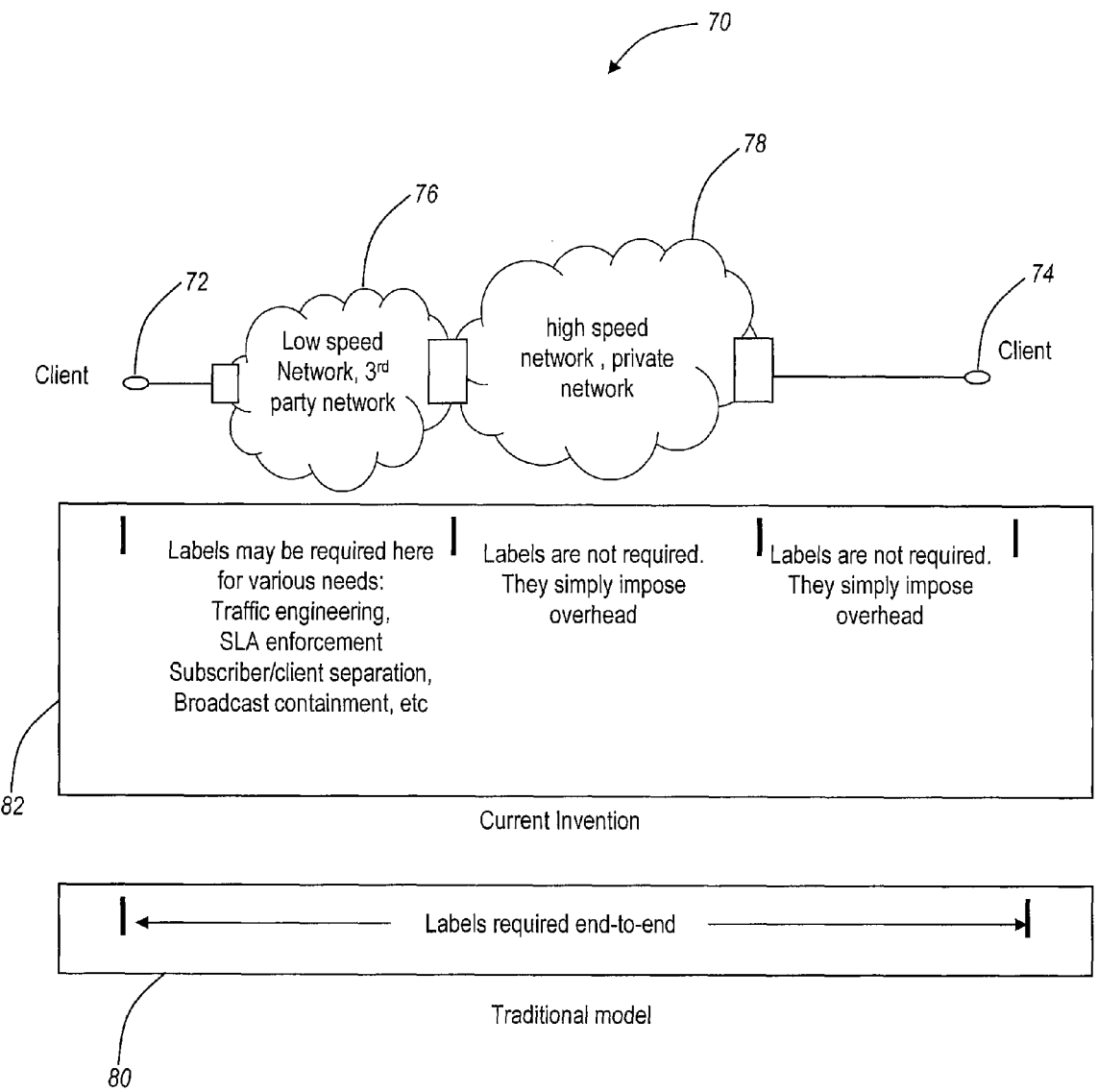
FIG. 5 is a network including clients interconnected through a low-speed network and a high-speed network according to an exemplary embodiment of the present invention.

Referring to FIG. 5, a network 70 includes clients 72,74 interconnected through a low-speed network 76 and a high-speed network 78 according to an exemplary embodiment of the present invention. The low-speed network 76 can include a third-party network or the like. The high-speed network 78 can include a private network, a carrier network, or the like. In a traditional model 80, labels are required on traffic flows between the clients 72,74 for policing, shaping, and the like. These labels are included across both networks 76,78.

In an exemplary embodiment 82 of the present invention, labels are not required in the high-speed network 78 or to the client 74 connected to the high-speed network 78. Instead, the high-speed network using the forwarding tables 50 to create virtual clusters 52 at an ingress switch. In the low-speed network 76, labels may be required for various needs, such as traffic engineering, service layer agreement (SLA) enforcement, subscriber/client separation, broadcast containment, and the like.

The fundamental concept of the present invention is the notion that one is not required to introduce explicit labels in the Ethernet frames to achieve various networking needs such as subscriber grouping, traffic engineering, policy control, meeting QoS requirements, etc., but rather to define these needs in each network elements on hop-by-hop basis as a set of policies/attributes wherever they are required. For example, labels impose excessive overhead in the transient network without added benefit.

A typical switch/router includes a plurality of interconnect cards, such as line cards configured to process ingress and egress traffic and a switch card configured to switch traffic flows between line cards. In the present invention, the forwarding table 50 is utilized by one or more of the cards to assign clusters and process the clusters accordingly based upon provisioning in the table 50. Also, egress traffic is prioritized and shaped responsive to the associated information in the table 50.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A system for Carrier Ethernet using referential tables for forwarding decisions, comprising:
a plurality of interconnected switches/routers, wherein one or more of the plurality of interconnected switches/routers comprises an ingress switch/router;
wherein the ingress switch/router is configured to one of prioritize and shape data based upon a referential table comprising a plurality of clusters and associated priority and bandwidth for each of the plurality of clusters;
wherein the referential table is utilized in addition to one or more Carrier Ethernet mechanisms for addressing or Quality of Service marking with the referential table configured to augment the one or more Carrier Ethernet mechanisms;
wherein data entering at the ingress switch/router is assigned to one of the plurality of clusters based upon one or more of media access control (MAC) source and destination pair and virtual local area network (VLAN) identification;
wherein the referential table is provided to the ingress switch/router through one of downloading using simple network management protocol and signaling using a control plane; and
wherein the one or more Carrier Ethernet mechanisms comprise using labels between at least two of the plurality of interconnected switches/routers in a low speed, third party network to a first client and not using labels between at least another two of the plurality of interconnected switches/routers comprising a high speed network to a second client, wherein frames do not comprise labels in the high speed network comprising a Carrier Ethernet network utilizing the referential table in addition to the one or more Carrier Ethernet mechanisms, wherein the high speed network interconnects to the first client via the low speed, third party network, and wherein layer two Quality of Service policing and shaping is done on any layer through the referential table without attachment to a VLAN, MAC-in-MAC, or T-MPLS.

2. The system for Carrier Ethernet of claim 1, wherein the referential table comprises a first table and a second table; and wherein the first table comprises clusters for outer labels, and the second table comprises clusters for inner labels.

3. The system for Carrier Ethernet of claim 1, wherein the referential table is provisioned through one or more of a network management system, an element management system, a craft interface, a control plane, a northbound CORBA interface, provider backbone transport (PBT), provider backbone bridging traffic engineering (PBB-TE), and an IP multimedia subsystem (IMS).

4. The system for Carrier Ethernet of claim 1, wherein the referential table further comprises one or more of inner/outer MAC source/VLAN source and MAC destination/VLAN destination, inner MAC source and outer VLAN destination, DiffServ Code Point, Internet Protocol (IP) address, Session Initiation Protocol, Multi-protocol Label Switching (MPLS) labels, p-bits, and Transmission Control Protocol/User Datagram Protocol (TCP/UDP) port numbers for each of the plurality of clusters.

5. The system for Carrier Ethernet of claim 1, wherein the ingress switch/router is configured to utilize the referential table for one or more of subscriber grouping, traffic engineering, policy control, and Quality of Service without requiring explicit labels in Ethernet frames.

6. A method for Carrier Ethernet using referential tables for forwarding decisions, comprising:
receiving incoming data flows at an ingress switch/router;
assigning each of the incoming data flows to a cluster of a plurality of clusters in a referential table; and
one of prioritizing and shaping the incoming data flows responsive to provisioning in the referential table, wherein the referential table is utilized in addition to one or more Carrier Ethernet mechanisms for addressing or Quality of Service marking with the referential table configured to augment the one or more Carrier Ethernet mechanisms;
wherein the assigning is based upon one or more of media access control (MAC) source and destination pair and virtual local area network (VLAN) identification of the incoming data flows;
wherein the referential table is provided to the ingress switch/router through one of downloading using simple network management protocol and signaling using a control plane; and
wherein the one or more Carrier Ethernet mechanisms comprise using labels between at least two of the plurality of interconnected switches/routers in a low speed, third party network to a first client and not using labels between at least another two of the plurality of interconnected switches/routers comprising a high speed network to a second client, wherein frames do not comprise labels in the high speed network comprising a Carrier Ethernet network utilizing the referential table in addition to the one or more Carrier Ethernet mechanisms, wherein the high speed network interconnects to the first client via the low speed, third party network, and wherein layer two Quality of Service policing and shaping is done on any layer through the referential table without attachment to a VLAN, MAC-in-MAC, or T-MPLS.

7. The method for Carrier Ethernet of claim 6, further comprising provisioning bandwidth and priority of the plurality of clusters.

8. The method for Carrier Ethernet of claim 7, wherein the provisioning is through one of a provisioning through a management system, downloading using simple network management protocol, signaling using a control plane, northbound CORBA interface, provider backbone transport (PBT)

mechanisms, provider backbone bridging traffic engineering (PBB-TE) mechanisms, and IP multimedia subsystem (IMS) mechanisms.

9. The method for Carrier Ethernet of claim 6, wherein the referential table further comprises policy information for the plurality of clusters; and further comprising enforcing policy on the incoming data flows.

10. The method for Carrier Ethernet of claim 6, further comprising:
grouping of subscribers in the incoming data flows responsive to the referential table;
engineering traffic in the incoming data flows responsive to the referential table; and
managing Quality of Service responsive to the referential table.

11. A network element for Carrier Ethernet using referential tables for forwarding decisions, comprising:
one or more line cards receiving ingress traffic and transmitting egress traffic; and
a referential table comprising a plurality of clusters and associated priority and bandwidth for each of the plurality of clusters;
wherein ingress traffic is assigned to one of the plurality of clusters responsive to one or more of media access control (MAC) source and destination pair and virtual local area network (VLAN) identification;
wherein egress traffic is shaped and prioritized responsive to the associated priority and bandwidth, and wherein the referential table is utilized in addition to one or more Carrier Ethernet mechanisms for addressing or Quality of Service marking with the referential table configured to augment the one or more Carrier Ethernet mechanisms;
wherein the referential table is provided to an ingress switch/router through one of downloading using simple network management protocol and signaling using a control plane; and wherein the one or more Carrier Ethernet mechanisms comprise using labels between at least two of a plurality of interconnected switches/routers in a low speed, third party network to a first client and not using labels between at least another two of the plurality of interconnected switches/routers comprising a high speed network to a second client, wherein frames do not comprise labels in the high speed network comprising a Carrier Ethernet network utilizing the referential table in addition to the one or more Carrier Ethernet mechanisms, wherein the high speed network interconnects to the first client via the low speed, third party network, and wherein layer two Quality of Service policing and shaping is done on any layer through the referential table without attachment to a VLAN, MAC-in-MAC, or T-MPLS.

12. The network element for Carrier Ethernet of claim 11, wherein the network element is connected to an over-provisioned switch; and
wherein the network element is configured to control bandwidth of the plurality of clusters to the over-provisioned switch responsive to a bandwidth of the over-provisioned switch.

13. The network element for Carrier Ethernet of claim 11, wherein the referential table is provisioned through one or more of a network management system, an element management system, and a craft interface.

14. The network element for Carrier Ethernet of claim 11, wherein the referential table further comprises policy information for the plurality of clusters.

15. The network element for Carrier Ethernet of claim 11, wherein the network element is configured to utilize the referential table for one or more of subscriber grouping, traffic engineering, policy control, and Quality of Service without requiring explicit labels in Ethernet frames.

* * * * *